Nov. 9, 1954 M. RETTINGER ET AL 2,694,111
MAGNETIC RECORDING CHANNEL
Filed Jan. 30, 1953
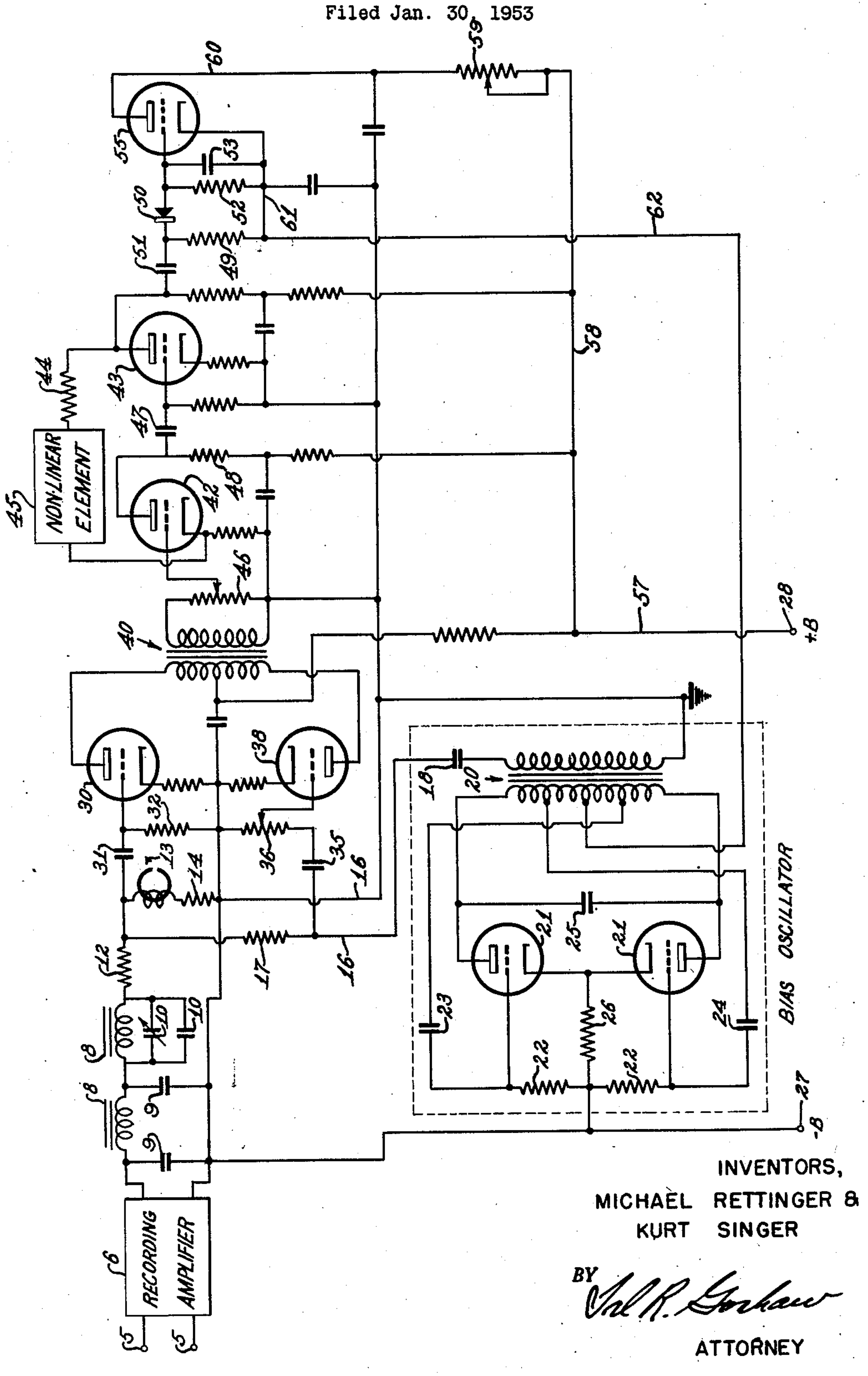
INVENTORS,
MICHAEL RETTINGER &
KURT SINGER
BY Vol R. Gorhau
ATTORNEY United States Patent Office 2,694,111

Patented Nov. 9, 1954

2,694,111

MAGNETIC RECORDING CHANNEL

Michael Rettinger, Encino, and Kurt Singer, North Hollywood, Calif., assignors to Radio Corporation of America, a corporation of Delaware Application January 30, 1953, Serial No. 334,334

9 Claims. (Cl. 179—100.2)

This invention relates to magnetic sound recording, and particularly to an automatic bias current control for a magnetic recording head to prevent high frequency attenuation with wear of the magnetic head.

It has been found that, in magnetic sound recording systems, the passage of the magnetic film over the head reduces the front gap pole face depth, which, in turn, produces an increase in the gap reluctance. The consequence of an increase of the gap reluctance of the recording head is a higher effective bias flux which produces an erase action which attenuates the high frequencies in the signals being recorded. It has been found that this increase in higher front gap reluctance is due to the decrease in the front gap pole piece depth and is not due to any widening of the gap.

It has been found that when the bias current is reduced proportionately with the wear on a magnetic recording head, the high frequency response of the head remains constant. Thus, the usable life of a magnetic recording head can be considerably extended by providing an automatic control of the bias current in a magnetic recording channel as the head wears. The invention, therefore, is directed to a method of and system for varying the bias current as needed to compensate for head wear and thus maintain the recorded high frequencies of a signal in the proper relationship with respect to the lower frequencies of the recorded signal.

The principal object of the invention, therefore, is to improve the recording of magnetic sound records.

Another object of the invention is to provide an improved magnetic sound recording system.

A further object of the invention is to provide an improved sound recording channel wherein the magnetic head bias current is varied automatically with head wear.

Although the novel features which are believed to be characteristic of this invention will be pointed out with particularity in the appended claims, the manner of its organization and the mode of its operation will be better understood by referring to the following description, read in conjunction with the accompanying drawing, forming a part hereof, in which:

The figure is a schematic drawing of a magnetic sound recording channel embodying the invention.

Referring now to the drawing, a signal to be recorded from any particular source is connected to terminals 5, which feed a recording amplifier 6. The output of the amplifier is passed over a bias current isolating filter composed of inductances 8 and condensers 9 and 10. The filter 8—9—10 is connected over a resistor 12 to a magnetic recording head 13 with its metering resistor 14.

Bias current is impressed on the recording head 13 over conductors 16 having an isolating resistor 17 and an isolating condenser 18 included therein. Bias current is obtained from the secondary of a transformer 20 forming a part of an oscillator which also includes vacuum tubes 21, resistors 22, resistor 26, and condensers 23, 24, and 25. The positive terminal of the B supply is connected at 28, and the negative terminal is connected at 27 in the well-known manner. The above described circuit corresponds to a normal magnetic recording channel. The following circuit constitutes the automatic bias control portion of the channel.

Shunted across the head 13 and metering resistor 14, is a vacuum tube amplifier 30 including a coupling condenser 31 and a grid resistor 32. Shunted across head 13, metering resistor 14, and isolating resistor 17, and coupled by a condenser 35 and a potentiometer 36, is a vacuum tube amplifier 38. The plates of the tubes 30 and 38 are connected to the primary of push-pull transformer 40, thus forming a differential amplifier. The secondary of the transformer is connected to a vacuum tube amplifier consisting of vacuum tubes 42 and 43. Negative feedback around these amplifier tubes is over resistor 44 and a non-linear element 45, which may, in its simplest form, consist of two diodes such as selenium or copper oxide elements, the resistance of which changes with current. The element 45 may or may not be used, depending upon the degree of accuracy of frequency compensation desired, since the relationship between head wear and bias current reduction is not a linear function.

A potentiometer 46 controls the input to tube 42, while the coupling between tubes 42 and 43 is over a condenser 47 and resistors 48. The tube 43 is coupled to a rectifier 50 over condenser 51 and a resistor 49, while the rectifier 50 is connected over a filter composed of a resistor 52 and condenser 53 to a direct current amplifier 55. The direct current amplifier 55 controls the plate voltage applied to the oscillator tubes 21, since it is in series in a circuit from the B+ terminal 28 over conductor 57, conductor 58, variable resistor 59, conductor 60, conductor 61, and conductor 62 to the mid-tap on the primary of transformer 20. Thus, any increase in the internal resistance of the tube 55 will reduce the bias voltage applied to the head 13.

The circuits shunted across the head 13 and resistors 14 and 17, control the current to the head. This is accomplished by first adjusting the potentiometer 36 so that the outputs of the tubes 30 and 38 are of equal voltage so that no voltage will appear across potentiometer 46. Since the voltages developed at the plates of tubes 30 and 38 are in phase and are impressed on the primary of push-pull transformer 40, there is, therefore, no voltage developed across the secondary of the transformer. An initial balance is obtained when the system is put into operation with a new recording head. As the inductance of the recording head 13 varies due to the wear of the pole pieces thereof, this will produce a differential voltage across potentiometer 46, which is applied to the amplifier 42—43.

The output of tube 43 is rectified by rectifier 50 and is filtered by resistor 52 and condenser 53, and then applied as a varying direct current bias to tube 55. As the grid of tube 55 is made more negative, the plate resistance thereof increases, which reduces the plate voltages on tubes 21, which results in a reduction of bias current on the head 13.

By virtue of this bias control, there is thus provided an automatic control of the frequency characteristic of the signal being recorded on the magnetic medium, which permits the magnetic head to be used over a longer period of time than heretofore, while recording all frequencies of a signal in their proper relationship.

For multitrack magnetic recording where one master oscillator is used for supplying the biasing current to all recording heads, the input to the differential amplifier is connected to any one of the heads. This will simultaneously correct for the wear on all heads, the control circuit being the same as shown in the figure.

We claim:

1. A system for maintaining the recorded frequency characteristic of a magnetic signal constant, said signal being impressed on a magnetic head on which high frequency biasing current is simultaneously impressed, comprising means for generating a current by and proportional to the change in inductance of said recording head caused by the wear thereof, and means for varying the biasing current to said head in accordance with the said generated current.

2. A system for maintaining a constant frequency characteristic for a signal being recorded on a magnetic medium by a magnetic head having a high frequency biasing current impressed thereon, comprising means for generating a current proportional to the variation in inductance of said recording head caused by the wear thereof, means for rectifying said current, and means for varying the biasing current impressed on said head in accordance with the value of said rectified current.

3. A system for automatically compensating for the variations in recorded frequency characteristics due to magnetic head wear, comprising a differential amplifier connected across said head, means for balancing the currents impressed on said differential amplifier to provide a zero current output therefrom, wear of said head increasing the current output from said differential amplifier, a rectifier for said current from said differential amplifier, a direct current amplifier, an oscillator connected to said head for supplying biasing current thereto, a source of anode potential for said oscillator, and a circuit from said source through said direct current amplifier to said oscillator, variations of said rectified current varying the resistance of said direct current amplifier and reducing the biasing current to said head.

4. A magnetic sound recording system comprising a magnetic head, means for impressing a signal to be recorded thereon, a circuit for simultaneously impressing on said head a biasing current, said circuit including a high frequency oscillator and a resistor, a differential amplifier, means for impressing on one tube of said differential amplifier the voltage across said head and on the other tube of said differential amplifier the voltage across said head and said resistor, means for balancing said voltages impressed on said differential amplifier to provide a zero output current therefrom, a rectifier for rectifying any output current from said differential amplifier, a direct current amplifier connected to said rectifier, a source of high potential, and a circuit from said source of high potential through said direct current amplifier and to said oscillator, wear on said head increasing the inductance of said head to provide an output current from said push-pull oscillator to increase the resistance of said direct current amplifier and reduce the biasing current from said oscillator to said head.

5. A magnetic sound recording system comprising a magnetic head on which a signal to be recorded is impressed, a high frequency oscillator, a first circuit for connecting said oscillator to said head for simultaneously impressing a high frequency biasing current thereon along with said signal, and a second circuit from said head to said oscillator for varying the amount of biasing current supplied to said head by said first circuit in accordance with the amount of wear on said head.

6. A magnetic sound recording system in accordance with claim 5, in which said second circuit includes a differential amplifier having no output for said magnetic head when new, said output increasing with increasing wear on said head, said second circuit decreasing said biasing current to said head with increasing output from said differential amplifier.

7. A magnetic sound recording system in accordance with claim 6, in which said second circuit also includes an amplifier for the output of said differential amplifier, said amplifier having a non-linear feedback circuit for compensating for the non-linearity between magnetic head wear and biasing current reduction.

8. A magnetic sound recording system in accordance with claim 6, in which said second circuit also includes a rectifier for the output of said differential amplifier and an amplifier for the output of said rectifier, the output of said rectifier varying the internal resistance of said last mentioned amplifier, and a circuit through said last mentioned amplifier to said oscillator.

9. A magnetic sound recording system in accordance with claim 8, in which a resistor is included in said first circuit and said second circuit also includes a connection between said head and said differential amplifier and a connection between said resistor and said differential amplifier.

No references cited.